(12) United States Patent
Lam et al.

(10) Patent No.: US 9,253,379 B2
(45) Date of Patent: Feb. 2, 2016

(54) MODULAR ELECTRONIC DEVICE SYSTEM WITH A DETACHABLE DISPLAY

(71) Applicant: Intel Corporation, Santa Clara, CA (US)

(72) Inventors: Hue Lam, Portland, OR (US); George Daskalakis, Forest Grove, OR (US); Kimi Jensen, Beaverton, OR (US); Ky Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 13/730,969

(22) Filed: Dec. 29, 2012

(65) Prior Publication Data

US 2014/0184904 A1    Jul. 3, 2014

(51) Int. Cl.
| | |
|---|---|
| H05K 5/00 | (2006.01) |
| H05K 7/00 | (2006.01) |
| G06F 1/16 | (2006.01) |
| H04N 5/225 | (2006.01) |

(52) U.S. Cl.
CPC ............ *H04N 5/2252* (2013.01); *G06F 1/1616* (2013.01); *G06F 1/1654* (2013.01)

(58) Field of Classification Search
CPC .............................. G06F 1/1616; G06F 1/1654
USPC ........................ 361/679.17, 679.29, 679.09
See application file for complete search history.

(56) References Cited

U.S. PATENT DOCUMENTS

| | | |
|---|---|---|
| D346,591 S | 5/1994 | Lee |
| 5,808,862 A | 9/1998 | Robbins |
| 6,025,990 A | 2/2000 | Daskalakis et al. |
| 6,167,613 B1 | 1/2001 | Jarrett et al. |
| 6,361,343 B1 | 3/2002 | Daskalakis et al. |
| 6,381,148 B1 | 4/2002 | Daskalakis et al. |
| 6,397,461 B1 | 6/2002 | Jarrett et al. |
| D461,802 S | 8/2002 | Tu |
| D462,679 S | 9/2002 | Liu |
| 6,551,120 B2 | 4/2003 | Daskalakis et al. |
| D479,718 S | 9/2003 | Herrmann et al. |

(Continued)

FOREIGN PATENT DOCUMENTS

| | | |
|---|---|---|
| CN | 101095248 A | 12/2007 |
| CN | 101287343 A | 10/2008 |

(Continued)

OTHER PUBLICATIONS

International Search Report and Written Opinion received for PCT Patent Application No. PCT/US2013/048285, mailed on Sep. 27, 2013, 10 pages.

(Continued)

*Primary Examiner* — Anthony Haughton
(74) *Attorney, Agent, or Firm* — Patent Capital Group (57) ABSTRACT

Particular embodiments described herein provide for an electronic device, such as a notebook computer or laptop, that includes a circuit board coupled to a plurality of electronic components (which includes any type of components, elements, circuitry, etc.). One particular example implementation of the electronic device may include means for establishing a first electrical connection between a first base and a lid portion; and means for establishing a second electrical connection between a second base and the lid portion. The lid portion is removably coupled to a selected one of the first base and the second base.

29 Claims, 10 Drawing Sheets

(56) References Cited

U.S. PATENT DOCUMENTS

| | | | |
|---|---|---|---|
| D504,889 S | 5/2005 | Andre et al. | |
| 7,002,795 B2 | 2/2006 | Trautman et al. | |
| D516,566 S | 3/2006 | Hsu | |
| 7,249,747 B2 | 7/2007 | Marceau et al. | |
| D551,670 S | 9/2007 | Ong et al. | |
| 7,280,347 B2 | 10/2007 | Wong et al. | |
| 7,486,279 B2 | 2/2009 | Wong et al. | |
| 7,626,358 B2 | 12/2009 | Lam et al. | |
| 7,672,120 B2 | 3/2010 | Kohlman et al. | |
| 7,969,117 B2 | 6/2011 | Lam et al. | |
| D654,073 S | 2/2012 | Li | |
| 8,467,183 B2 * | 6/2013 | Probst et al. | 361/679.55 |
| 8,472,186 B2 * | 6/2013 | Probst et al. | 361/679.55 |
| D685,783 S | 7/2013 | Bryan et al. | |
| 8,498,100 B1 * | 7/2013 | Whitt et al. | 361/679.17 |
| 8,625,272 B2 * | 1/2014 | Huang et al. | 361/679.41 |
| D735,717 S | 8/2015 | Lam et al. | |
| 2003/0112585 A1 | 6/2003 | Silvester | |
| 2004/0169995 A1 | 9/2004 | Ghosh et al. | |
| 2004/0174667 A1 | 9/2004 | Kim et al. | |
| 2004/0228076 A1 | 11/2004 | Clapper | |
| 2005/0162821 A1 | 7/2005 | Homer et al. | |
| 2006/0038795 A1 | 2/2006 | Lee | |
| 2007/0097087 A1 | 5/2007 | Homer et al. | |
| 2011/0199727 A1 | 8/2011 | Probst | |
| 2011/0267757 A1 * | 11/2011 | Probst et al. | 361/679.09 |
| 2012/0106059 A1 * | 5/2012 | Probst et al. | 361/679.09 |
| 2012/0106068 A1 * | 5/2012 | Huang et al. | 361/679.41 |
| 2013/0170126 A1 * | 7/2013 | Lee | 361/679.17 |
| 2014/0169853 A1 * | 6/2014 | Sharma et al. | 400/481 |

FOREIGN PATENT DOCUMENTS

| | | |
|---|---|---|
| TW | 1292870 B | 1/2008 |
| TW | 1328303 B | 8/2010 |
| TW | 1329796 B | 9/2010 |
| WO | WO 2014/105193 A1 | 7/2014 |

OTHER PUBLICATIONS

Office Action received for U.S. Appl. No. 29/441,013, mailed on Feb. 12, 2014, 6 Pages.

Lenovo IdeaPad Yoga 13 User Guide V1.0, Jul. 2012, 39 pages.

USPTO Nov. 28, 2014 Nonfinal Rejection in U.S. Appl. No. 29/441,013, 14 pages.

USPTO Apr. 2, 2015 Notice of Allowance in U.S. Appl. No. 29/441,013, 7 pages.

International Preliminary Report on Patentability received for PCT Patent Application No. PCT/US2013/048285, mailed on Jul. 9, 2015, 9 pages.

* cited by examiner

MODULAR ELECTRONIC DEVICE SYSTEM WITH A DETACHABLE DISPLAY

TECHNICAL FIELD

Embodiments described herein generally relate to modular configurations for an electronic device.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to detachable display configurations for an electronic device. Features such as structure(s), function(s), and/or characteristic(s), for example, are described with reference to one embodiment as a matter of convenience; various embodiments may be implemented with any suitable one or more of the described features.

With the recent touch optimized operating system (OS) release for tablets, convertible laptops (i.e., clamshell computers) have become more popular. However, convertible hinge designs have drawbacks with mechanical complications and, further, they can present usability issues for certain consumer groups. For example, mechanical complications include how to run the electrical signal from the base to the lid. One common solution is an electrical cable; however, an electrical cable can create problems when converting a device from a laptop configuration to a tablet configuration. In addition, to accommodate the cable, devices need to be thick and cannot operate as a thin small system with convertible features. In at least one example embodiment discussed herein, an electrical device can be configured to make the lid of a laptop computer removable such that the overall system can be modular and, further, configured to operate in either traditional laptop (i.e., clamshell) or tablet modes.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device may also include a base portion and a lid portion coupled to the base portion at a hinge configured such that the base portion and the lid portion can be separated and a different base portion and/or lid portion can be coupled together, thus, allowing the electronic device to be modular. Certain embodiments presented herein do not require a cable extending from the base to the lid. Additionally, certain embodiments can allow for an effective hinge and connection capability that provides an orientation flexibility and suitable connection to enable modularity between the base portion and the lid portion.

The electronic device may also include a magnetic assembly to guide the base and lid into a proper configuration. The hinge can include connectors and mechanical retentions to provide an electrical connection between the base and the lid. In an embodiment, a printed circuit board (PCB) interconnector is used to electrically connect the base and the lid. Additionally, the lid may be separated from the body both electrically and mechanically: allowing the lid to be flipped over and alternate between a clamshell configuration and a tablet configuration. In an embodiment, the majority of the system components (e.g., motherboard, hard drive, battery, communication modules, etc.) remain in the base. In addition, the hinges can remain in the base to allow another (different) lid to be attached to the base, or to allow the lid that was removed to be attached to another different base. The lid can include a display in certain embodiments (e.g., the display can be a touchscreen display). The lid may also contain a camera module, microphone, speakers, and/or a wireless module. Such a design allows for the electronic device to function in a clamshell configuration or a tablet configuration. In an embodiment, the lid may contain a battery and suitable electronics (e.g., processor, memory, etc.) that allow the lid to operate as a standalone device.

Modular Configuration for Electronic Device

Figure 1A:
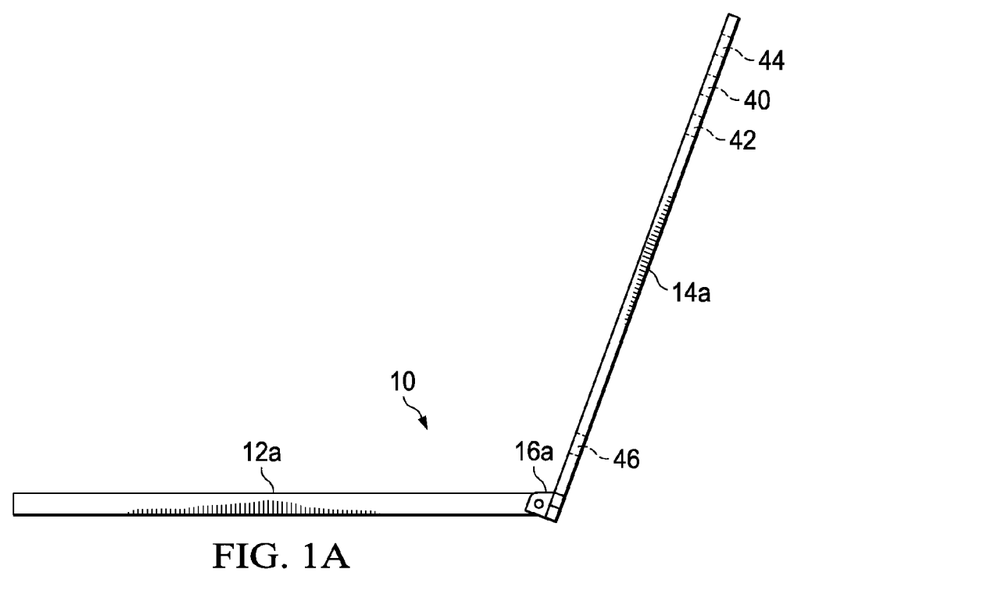
FIG. 1A is a simplified schematic diagram illustrating an embodiment of an electronic device in an open clamshell configuration, in accordance with one embodiment of the present disclosure.

FIG. 1A is a simplified schematic diagram illustrating an embodiment of an electronic device 10 in an open clamshell mode configuration in accordance with one embodiment of the present disclosure. Electronic device 10 may include a base portion 12a, a lid portion 14a (which includes a display described in more detail below), and a hinge 16a. In one or more embodiments, electronic device 10 is a notebook computer or laptop computer, or Ultrabook™. In still other embodiments, electronic device 10 may be any suitable electronic device having a display such as a mobile device, a tablet computer and/or a tablet device (e.g., i-Pad™), a personal digital assistant (PDA), a smartphone, Android™ phones, i-Phones™, Google Nexus™, Microsoft Surface™, personal computer, server, an audio system, a movie player of any type, a computer docking station, etc. In yet another embodiment, most of the electronics (e.g., processor, memory, etc.) for electronic device 10 reside in base portion 12a. Hinge 16a can define an axis of rotation that is shared between base portion 12a and lid portion 14a.

Lid portion 14a can contain a liquid crystal display (LCD), organic light-emitting diode (OLED), or some other type of display. In another embodiment, lid portion 14a may contain a battery and various electronics (e.g., processor, memory, etc.) to allow lid portion 14 to operate as a standalone tablet. In another embodiment, lid portion may contain a wireless module 40 (e.g., Wi-Fi module, Bluetooth module, etc.) that allows lid portion 14a to communicate with base portion 12a when lid portion 14a is removed from base portion 12a. In yet another embodiment, lid portion 14a may contain a camera 44, a microphone 42, and speakers 46.

Figure 1B:
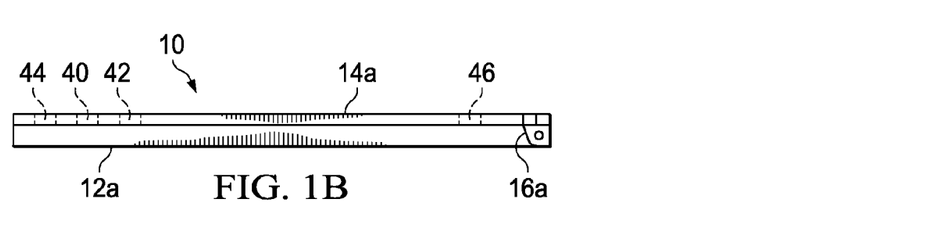
FIG. 1B is a simplified schematic diagram illustrating an embodiment of an electronic device in a closed clamshell configuration, in accordance with one embodiment of the present disclosure.
Figure 1C:
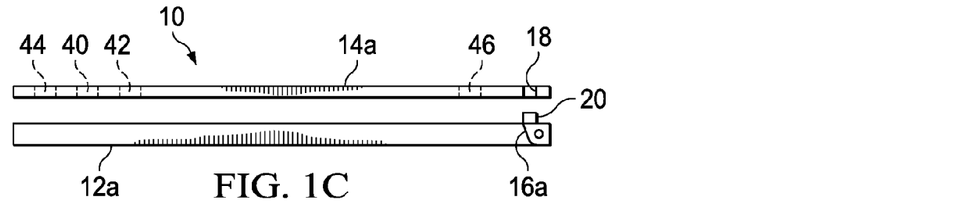
FIG. 1C is a simplified schematic diagram illustrating an embodiment of an electronic device in a detach mode, separated into two segments, in accordance with one embodiment of the present disclosure.

Turning to FIG. 1B, FIG. 1B is a simplified schematic diagram illustrating a side view of electronic device 10 in a closed clamshell configuration in accordance with one embodiment of the present disclosure. FIG. 1C is a simplified schematic diagram illustrating an embodiment of an electronic device in a detach mode, separated into two segments. As illustrated, lid portion 14a has been separated from base portion 12a. Hinge portion 16a includes a tab 20. Lid portion 14a includes a notch 18 (both tab 20 and notch 18 are described in more detail below; both of these terms encompass any type of protrusion, knob, projection, connector, protuberance, etc.).

Figure 1D:
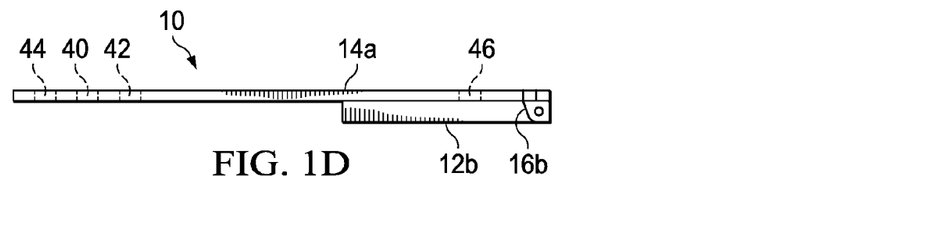
FIG. 1D is a simplified schematic diagram illustrating an embodiment of an electronic device in a tablet mode, in accordance with one embodiment of the present disclosure.

FIG. 1D is a simplified schematic diagram illustrating an embodiment of an electronic device in a tablet mode in accordance with one embodiment of the present disclosure. In one embodiment, lid portion 14a has been turned over so electronic device 10 is a tablet computer and/or a tablet device. In an embodiment, base portion 12b may be similar to base portion 12a except base portion 12b does not have a keyboard (whereas base portion 12a does have a keyboard). In another embodiment, base portion 12b may contain fewer or different electronics than base portion 12a. For example, base 12b may be a wireless module, a scanning module, a battery pack, etc.

FIGS. 1A-1D illustrate the modularity of electronic device 10. For example, lid portion 14a may be connected to base portion 12a or base portion 12b. In other examples, base portion 12a (or 12b) may be connected to a lid portion that is larger, smaller, or have different electrical components or functions than lid portion 14a. Electronic device 10 can be configured with a base and/or lid that can be interchanged with a different base and/or lid, each having different electronics and functions, thus allowing electronic device 10 to be modular. It is imperative to note that the base with the keyboard in several of the FIGURES can be changed to either move the keyboard toward the back and/or add a touch pad. Any such permutations are clearly within the scope of the teachings of the present disclosure.

Figure 2A:
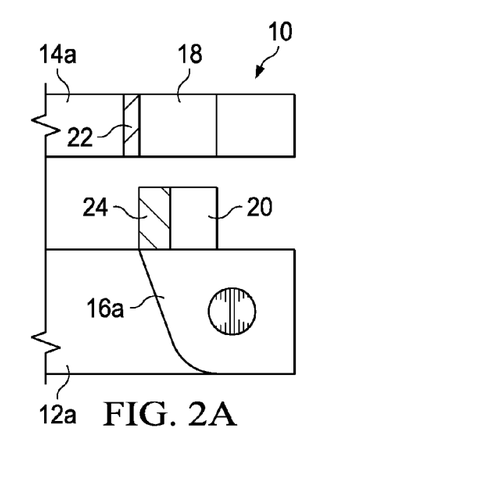
FIG. 2A is a simplified schematic diagram illustrating an embodiment of an electronic device in a detach mode, separated into two segments, in accordance with one embodiment of the present disclosure.

Turning to FIG. 2A, FIG. 2A is a simplified schematic diagram illustrating an embodiment of an electronic device in a detach mode, separated into two segments in accordance with one embodiment of the present disclosure. This particular embodiment includes a printed circuit board (PCB) interconnector 22 and a compression connector 24. As tab 20 slides into notch 18, compression connector 24 engages PCB interconnector 22 such that an electrical connection is created between base portion 12a and lid portion 14a. Note that base portion 12a and lid portion 14a are used as examples only and the examples provided should not limit the scope or inhibit the broad teachings of the modular electronic device, as potentially applied to a myriad of other architectures. In an embodiment, tab 20 and compression connector 24 are on hinge portion 16a.

Using PCB interconnector 22, an electrical current and signals can be passed from base portion 12a to lid portion 14a to recharge an on-board battery or capacitor, power any number of items (e.g., a display 28, wireless module 40, camera 44, speakers 46, etc.), and provide a communication path between base portion 12a and lid portion 14a. In other examples, electrical current and signals can be passed through a plug-in connector (e.g., whose male side protrusion connects to base portion 12a and whose female side connects to lid portion 14a or vice-verse). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10. [Thunderbolt™ and the Thunderbolt logo are trademarks of Intel Corporation in the U.S. and/or other countries.]. Virtually any other electrical connection methods could be used and, thus, are clearly within the scope of the present disclosure. Note that numerous different base portions may be electrically connected with numerous different lid portions, thus allowing electronic device 10 to be modular.

Figure 2B:
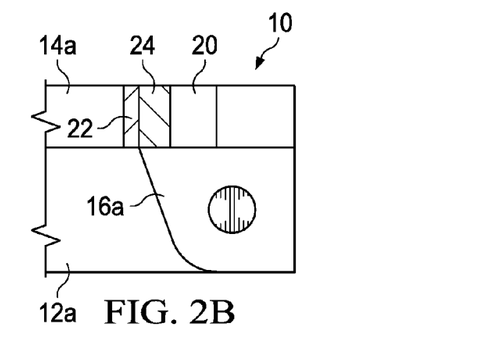
FIG. 2B is a simplified schematic diagram illustrating an embodiment of an electronic device in an attached mode with two segments connected, in accordance with one embodiment of the present disclosure.

Turning to FIG. 2B, FIG. 2B is a simplified schematic diagram illustrating an embodiment of an electronic device in an attached mode with two segments connected in accordance with one embodiment of the present disclosure. In this particular embodiment, tab 20 has slid into notch 18 and PCB interconnector 22 is electrically connected to compression connector 24. In an embodiment, a mechanical snap-in feature may be used to attach, retain, and detach any base portion (e.g., base 12a or 12b) from any lid portion (e.g., lid 14a).

Figure 3A:
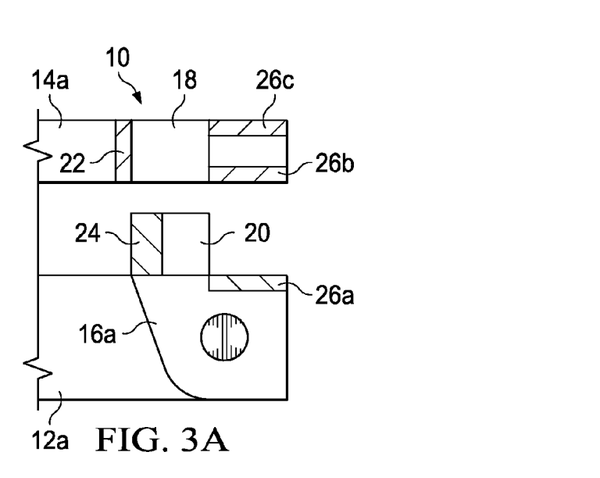
FIG. 3A is a simplified schematic diagram illustrating an embodiment of an electronic device in a detach mode, separated into two segments, in accordance with one embodiment of the present disclosure.

Turning to FIG. 3A, FIG. 3A is a simplified schematic diagram illustrating an embodiment of an electronic device in a detach mode, separated into two segments in accordance with one embodiment of the present disclosure. This particular embodiment includes magnets 26a-c. Magnet 26a may be located on base portion 12a. In an embodiment, magnet 26a is located on hinge portion 16a. Magnets 26b and c may be located on lid portion 14a. Magnets 26a-c can provide magnetic lead-in guidance and an attraction force for retention when base portion 12a is connected to lid portion 14a. In one example operation, when lid portion 14a is lowered onto base portion 12a, magnets 26a and b may help align tab 20 into notch 18 and secure PCB interconnector 22 to compression connector 24. Magnet 26c functions in the same manner as magnet 26b when lid portion 14a is turned over and secured to base 12a. In an embodiment, more than one magnet is located on base portion 12a (or hinge portion 16a) and the magnets alternate north and south. In addition, more than one magnet may be located on lid portion 14a and the magnets 26 are correspondently orientated north and south to align with the magnets on base portion 12a (or hinge portion 16a).

Figure 3B:
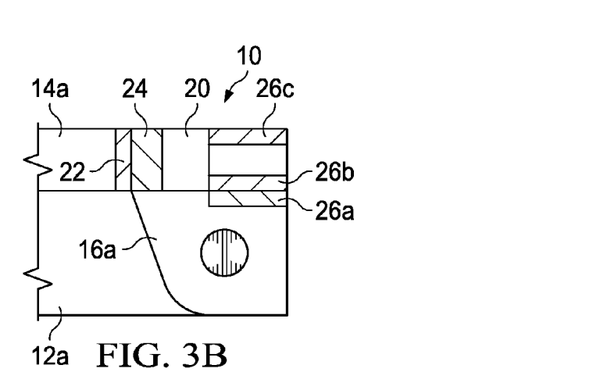
FIG. 3B is a simplified schematic diagram illustrating an embodiment of an electronic device in an attached mode, in accordance with one embodiment of the present disclosure.

Turning to FIG. 3B, FIG. 3B is a simplified schematic diagram illustrating an embodiment of an electronic device in an attached mode in accordance with one embodiment of the present disclosure. Magnets 26a and b have helped tab 20 slid into notch 18 and secure PCB interconnector 22 to compression connector 24. Magnets 26a and b also assist in securing base portion 12a to lid portion 14a. In an embodiment, the attractive force between magnet 26a and magnet 26b (or magnet 26c) is such that a relatively small amount of force is required to remove lid portion 14a from base portion 12a (e.g., a user can remove lid portion 14a from base portion 12a with one hand).

Figure 3C:
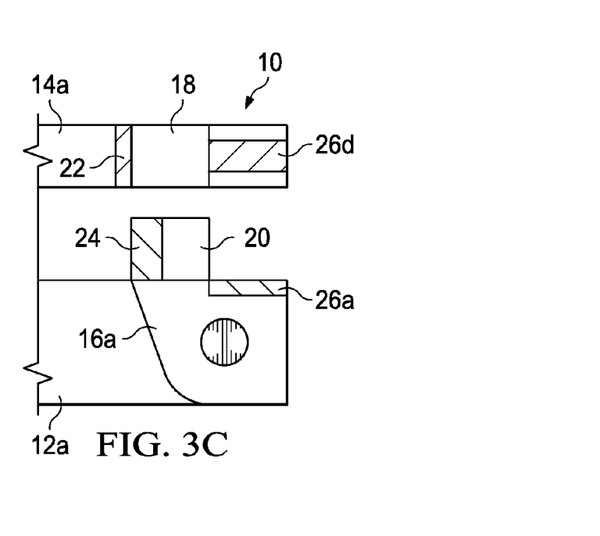
FIG. 3C is a simplified schematic diagram illustrating an embodiment of an electronic device in a detached mode accordance with one embodiment of the present disclosure.

Turning to FIG. 3C, FIG. 3C is a simplified schematic diagram illustrating an embodiment of an electronic device in a detached mode in accordance with one embodiment of the present disclosure. This particular embodiment includes magnet 26d in lid portion 14a. Magnet 26d functions similarly to magnets 26b and c.

One or more of magnets 26a-d may be encased in electronic device 10 and provide a directional focus for the magnetic field created by magnets 26a-d. In addition, magnets 26a-d may be accompanied by a suitable backing (e.g., a steel backing) to reduce unwanted stray magnetic fields. In a particular example implementation, rare earth magnets with alternating polarity and a steel back plate are used to reduce stray magnetic fields and to concentrate the magnetic fields in a desired direction.

Figure 4A:
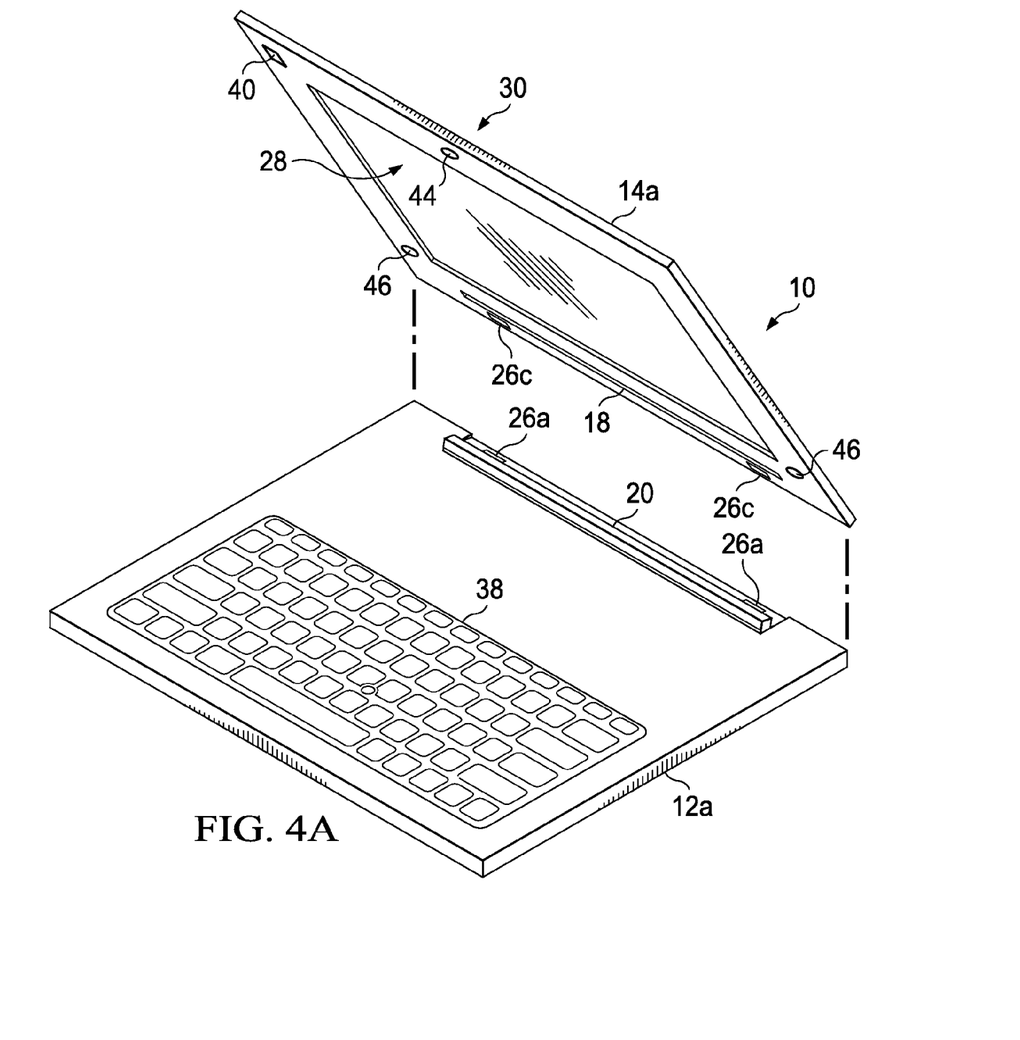
FIG. 4A is a simplified orthographic view of an electronic device separated into two segments, in accordance with one embodiment of the present disclosure.

FIG. 4A is a simplified orthographic view of an electronic device separated into two segments, in accordance with one embodiment of the present disclosure. By connecting the two separated segments, electronic device 10 can be in a clamshell mode open configuration. Electronic device 10 may include a keyboard 38. Disposed within/on and/or supported by top portion 14a may be a display 28. In one or more embodiments, display 28 is a screen that can be a liquid crystal display (LCD) display screen, a light-emitting diode (LED) display screen, an organic light-emitting diode (OLED) display screen, a plasma display screen, or any other suitable display screen system. Display 28 may be a touchscreen that can detect the presence and location of a touch within the display area.

In one or more embodiments, electronic device 10 is a notebook computer or laptop computer. In general terms, electronic device 10 can offer a suitably comfortable grip for an end user to manipulate base portion 12a (e.g., to separate it from lid portion 14a). The power of electronic device 10 can be physically isolated from its chassis and/or it can be integrated within base portion 12a. Moreover, electronic device 10 can offer docking that allows power and/or data to flow between the device and the accessory to which it is docked.

Figure 4B:
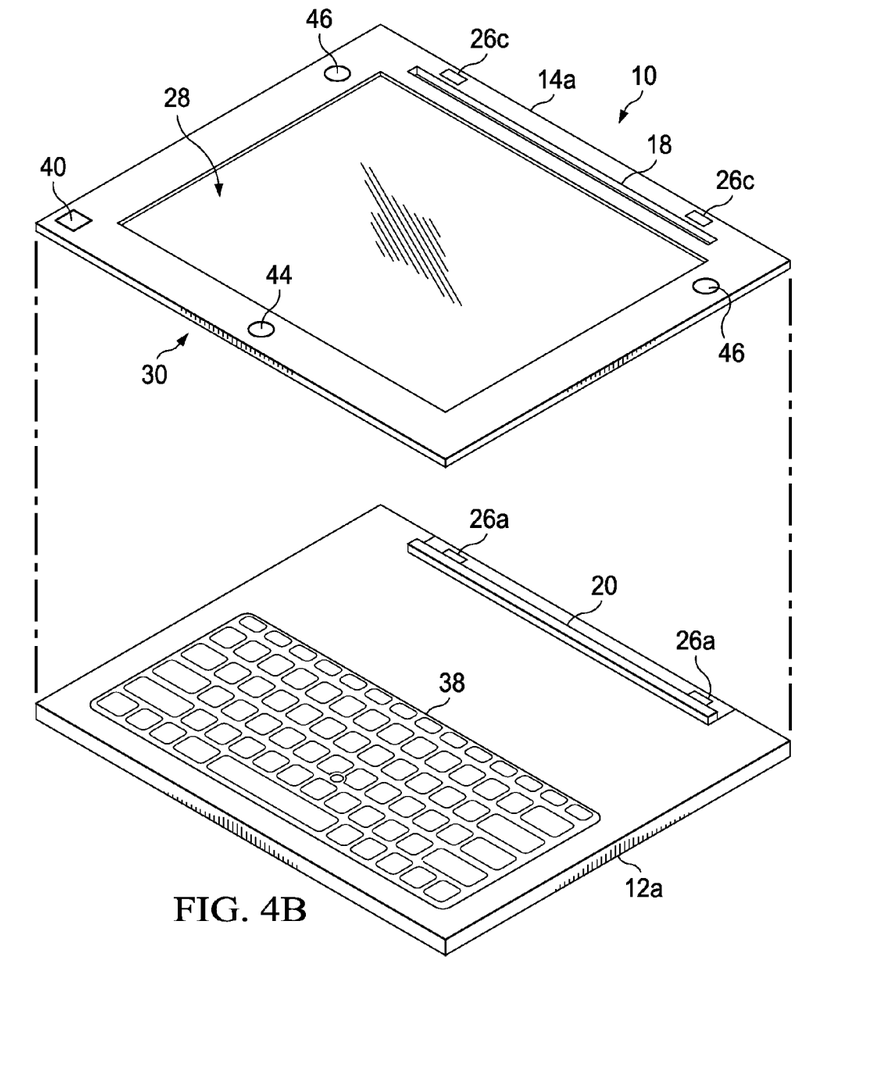
FIG. 4B is a simplified orthographic view of an electronic device separated into two segments, in accordance with one embodiment of the present disclosure.

FIG. 4B is a simplified orthographic view of an electronic device separated into two segments, in accordance with one embodiment of the present disclosure. In this particular embodiment, electronic device 10 is a relatively thin and sleek tablet having a touch screen (e.g., display 28) and a detachable and re-attachable base portion 12a. Electronic device 10 allows lid portion 14a to be attached to base portion 12a in two different orientations: display 28 facing inward (as illustrated in FIG. 4A—clamshell mode) or display 28 facing outward (as illustrated in FIG. 4B—tablet mode). Electronic device 10 can be configured in multiple possible configurations such as a clamshell configuration (both an open and closed configuration), tablet configuration, movie configuration, etc.

In operation, when electronic device 10 is in a clamshell configuration (as shown in FIG. 4A), the closed position allows base portion 12a to protect display 28 on lid portion 14a. When lid portion 14a is rotated up to an open position, electronic device 10 can operate in a traditional laptop orientation (i.e., a keyboard resting on a top surface of base with a display held in an upright position). When the display section is flipped upside-down to face outwardly in a tablet configuration (as shown in FIG. 4B) keyboard 38 may be nested behind lid portion 14a and out of the way of user interaction. In an embodiment, base portion 12a can operate as a stand (behind lid portion 14a) and electronic device 10 can become a stationary display (e.g., movie mode).

Figure 5A:
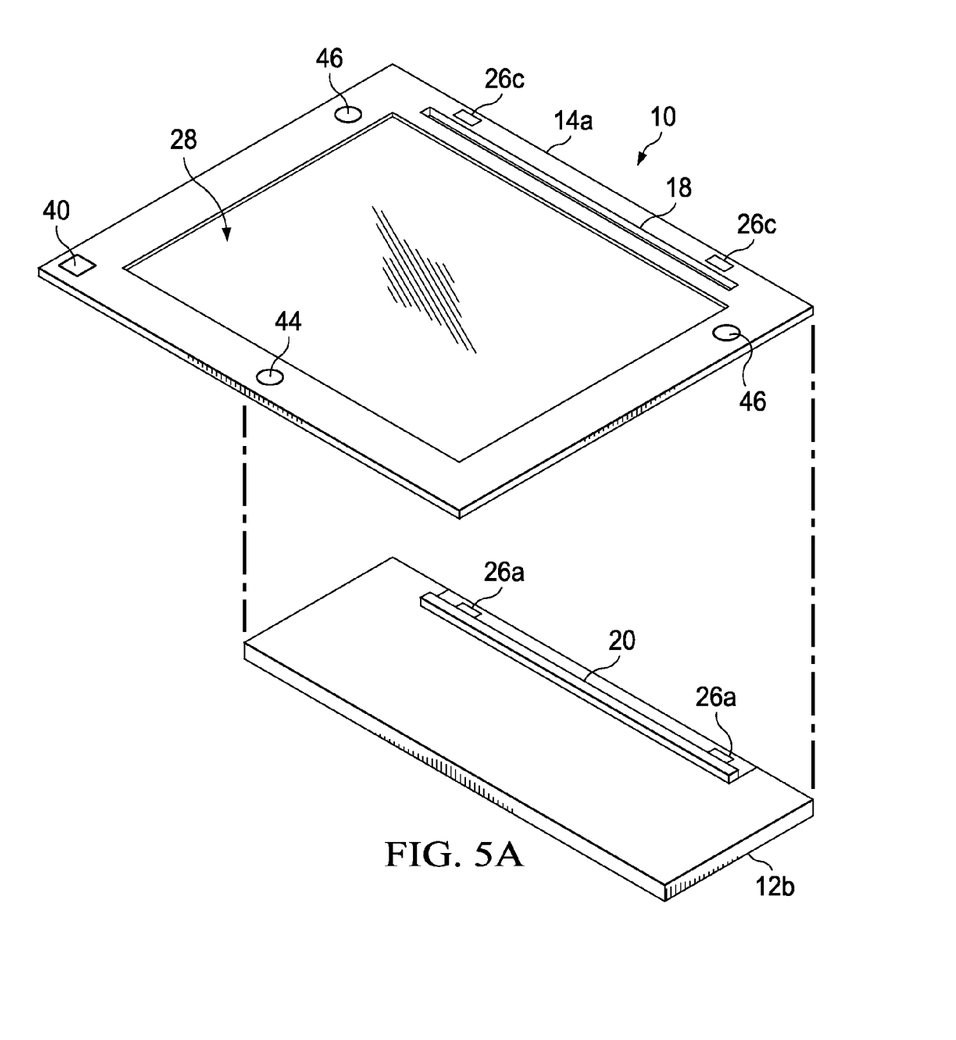
FIG. 5A is a simplified orthographic view of an electronic device separated into two segments, in accordance with one embodiment of the present disclosure.

FIG. 5A is a simplified orthographic view of an electronic device separated into two segments, in accordance with one embodiment of the present disclosure. In an embodiment, base portion 12b may be similar to base portion 12a except base portion 12b does not have a keyboard (whereas base portion 12a does have a keyboard). In another embodiment, base portion 12b may contain different electronics than base portion 12a. For example, base portion 12b may be a wireless module, a scanning module, a battery pack, etc. Electronic device 10 may be in a clamshell (or laptop configuration) or in a tablet configuration (as shown). Base portion 12b may have different mother board (MB) than base portion 12a which may have smaller battery needs so the overall volume of base can be a lot smaller. By reducing the battery size, the base weight may be reduced for a better tablet experience.

Figure 5B:
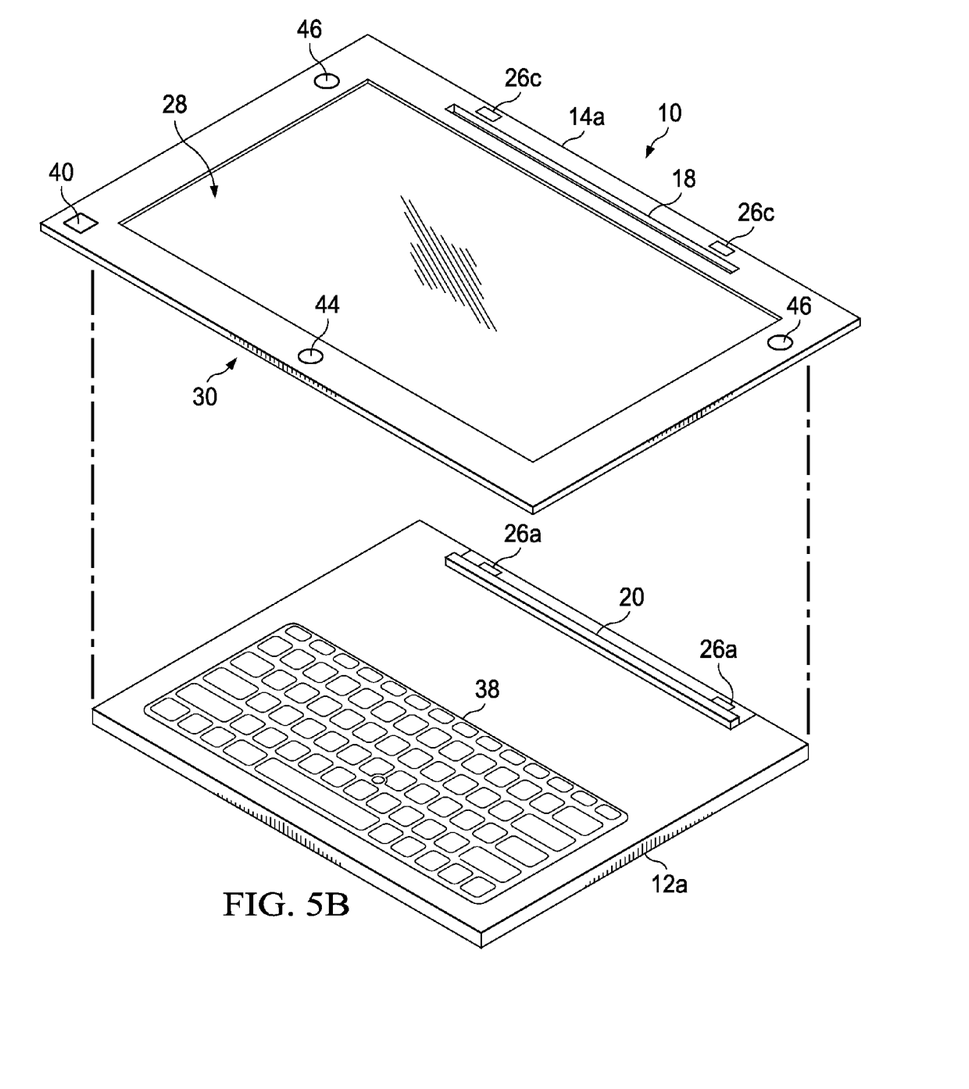
FIG. 5B is a simplified orthographic view of an electronic device separated into two segments, in accordance with one embodiment of the present disclosure.

FIG. 5B is a simplified orthographic view of an electronic device separated into two segments, in accordance with one embodiment of the present disclosure. In an embodiment, lid portion 14b may be similar to lid portion 14a except lid portion 14b may be larger than lid portion 14a. In another embodiment, lid portion 14b may contain different electronics then lid portion 14a. For example, lid portion 14b may include a wireless module, a battery pack, etc. Lid portion 14b may be a self-contained device that can be separated from base portion 12a (or 12b) and taken to a different location. Lid portion 14b may communicate with base portion 12a, a network (e.g., a cloud network), etc. wirelessly using wireless module 40 or may be a standalone unit that does not need to communicate with base portion 12a (or 12b).

Figure 6A:
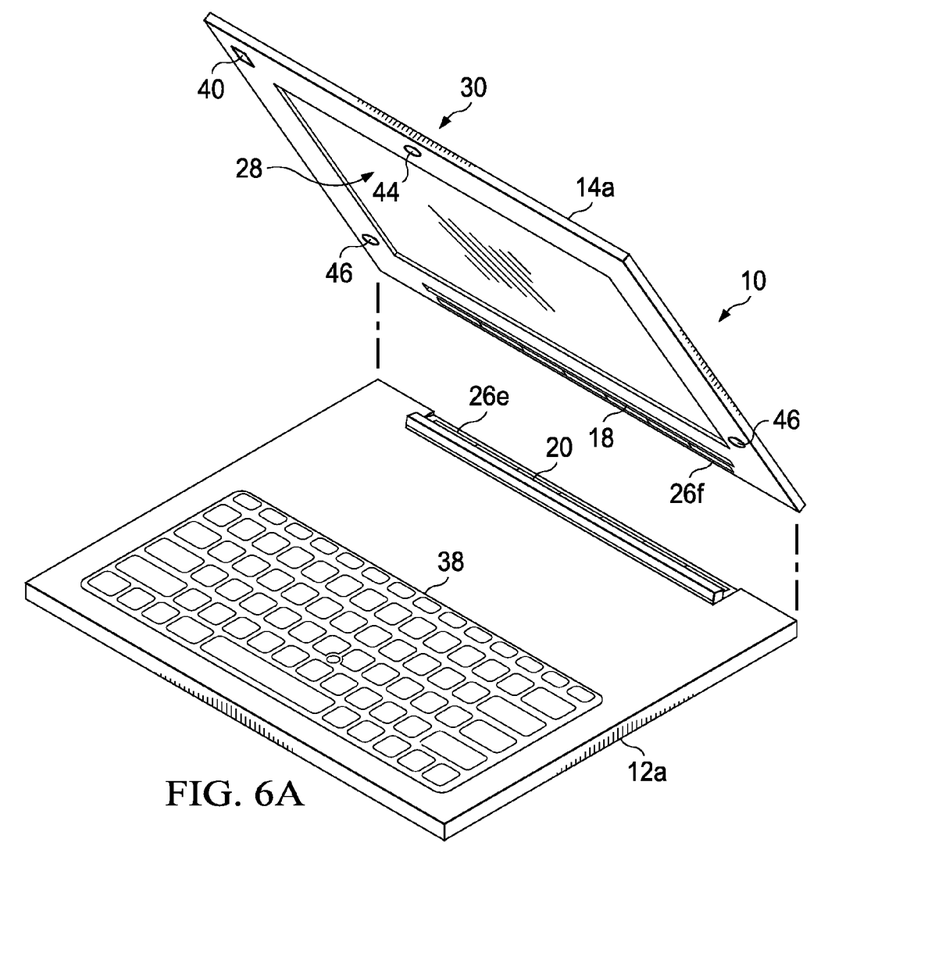
FIG. 6A is a simplified orthographic view of an electronic device separated into two segments, in accordance with one embodiment of the present disclosure.

FIG. 6A is a simplified orthographic view of an electronic device separated into two segments, in accordance with one embodiment of the present disclosure. Base portion 12a includes a row of magnets 26e. Lid portion 14a includes a row of corresponding magnets 26f that can mate with magnets 26e. Magnets 26e and 26f may alternate north and south. In one embodiment, magnets (similar to magnets 26f) may be located on both sides of lid portion 14a (as shown in FIGS. 3A and 3B). In another embodiment, one row of magnets may be located in lid portion 14a (as shown in FIG. 3C). Magnets 26e and 26f can provide magnetic lead-in guidance and attraction force for retention when base portion 12a is connected to lid portion 14a.

Figure 6B:
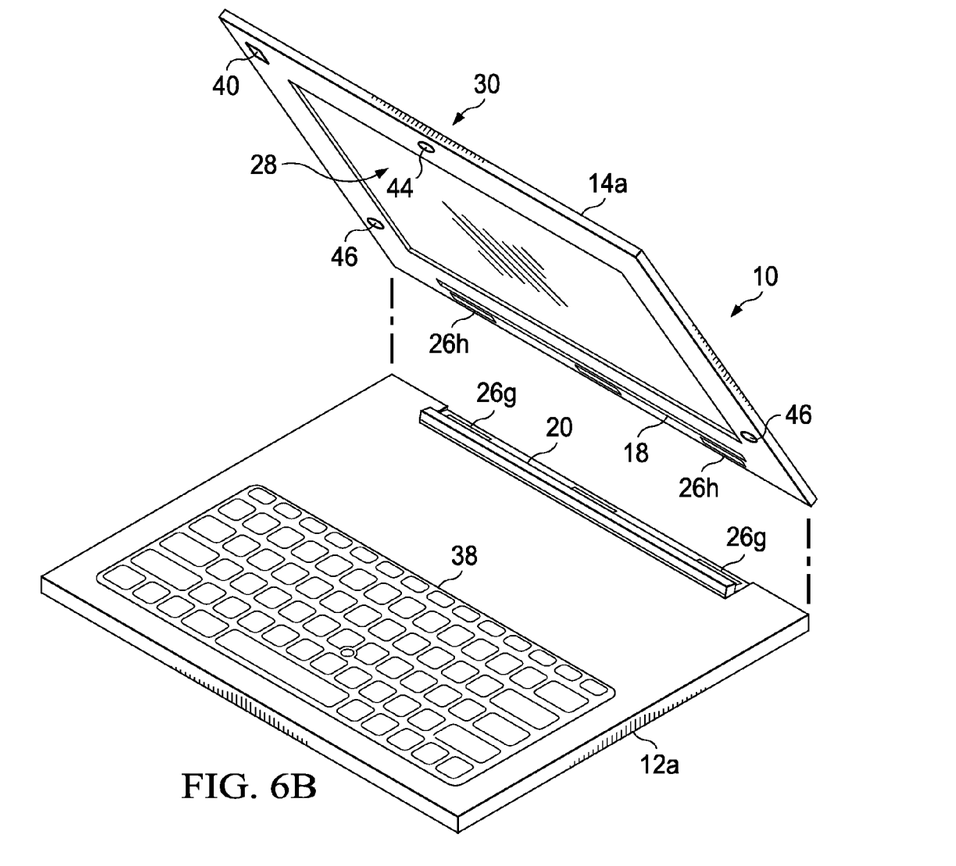
FIG. 6B is a simplified orthographic view of an electronic device separated into two segments, in accordance with one embodiment of the present disclosure.

FIG. 6B is a simplified orthographic view of an electronic device separated into two segments, in accordance with one embodiment of the present disclosure. Base portion 12a includes a row of spaced apart magnets 26g. Lid portion 14a includes a row of corresponding spaced apart magnets 26h. In an embodiment, the magnets may be evenly spaced apart. Note that any number of magnets may be spaced apart, for example, the number of magnets may be 3, 4, 5, 6, etc. Each row of spaced apart magnets 26g and 26h may correspondingly alternate north and south. In one embodiment, spaced apart magnets 26h may be located on both sides of lid portion 14a (as shown in FIGS. 3A and 3B). In another embodiment, spaced apart magnets 26h may be located in lid portion 14a (as shown in FIG. 3C). Spaced apart magnets 26g and 26h can provide magnetic lead-in guidance and attraction force for retention when base portion 12a is connected to lid portion 14a.

Figure 7:
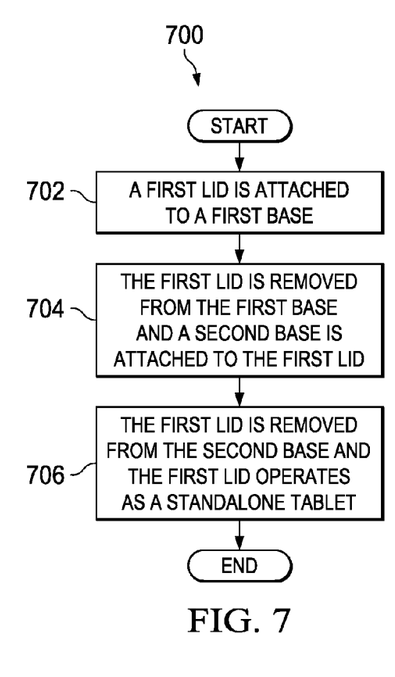
FIG. 7 is a simplified flow diagram illustrating potential operations associated with one embodiment of the present disclosure.
Figure 8:
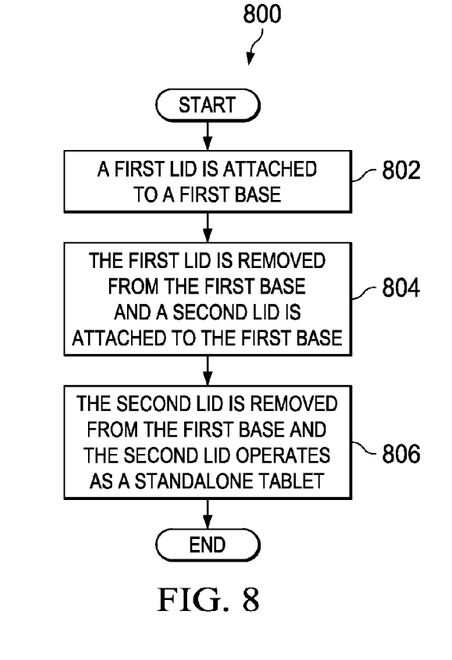
FIG. 8 is a simplified flow diagram illustrating potential operations associated with one embodiment of the present disclosure.

Turning to FIG. 7, FIG. 7 is a simplified flowchart 700 illustrating example activities of a modular electronic device system. At 702, a first lid is attached to a first base. At 704, the first lid is removed from the first base and a second base is attached to the first lid. At 706, the first lid is removed from the second base and the first lid operates as a standalone tablet. Turning to FIG. 8, FIG. 8 is a simplified flowchart 800 illustrating example activities of a modular electronic device system. At 802, a first lid is attached to a first base. At 804, the first lid is removed from the first base and a second lid is attached to the first base. At 806, the second lid is removed from the first base and the second lid operates as a standalone tablet.

Figure 9:
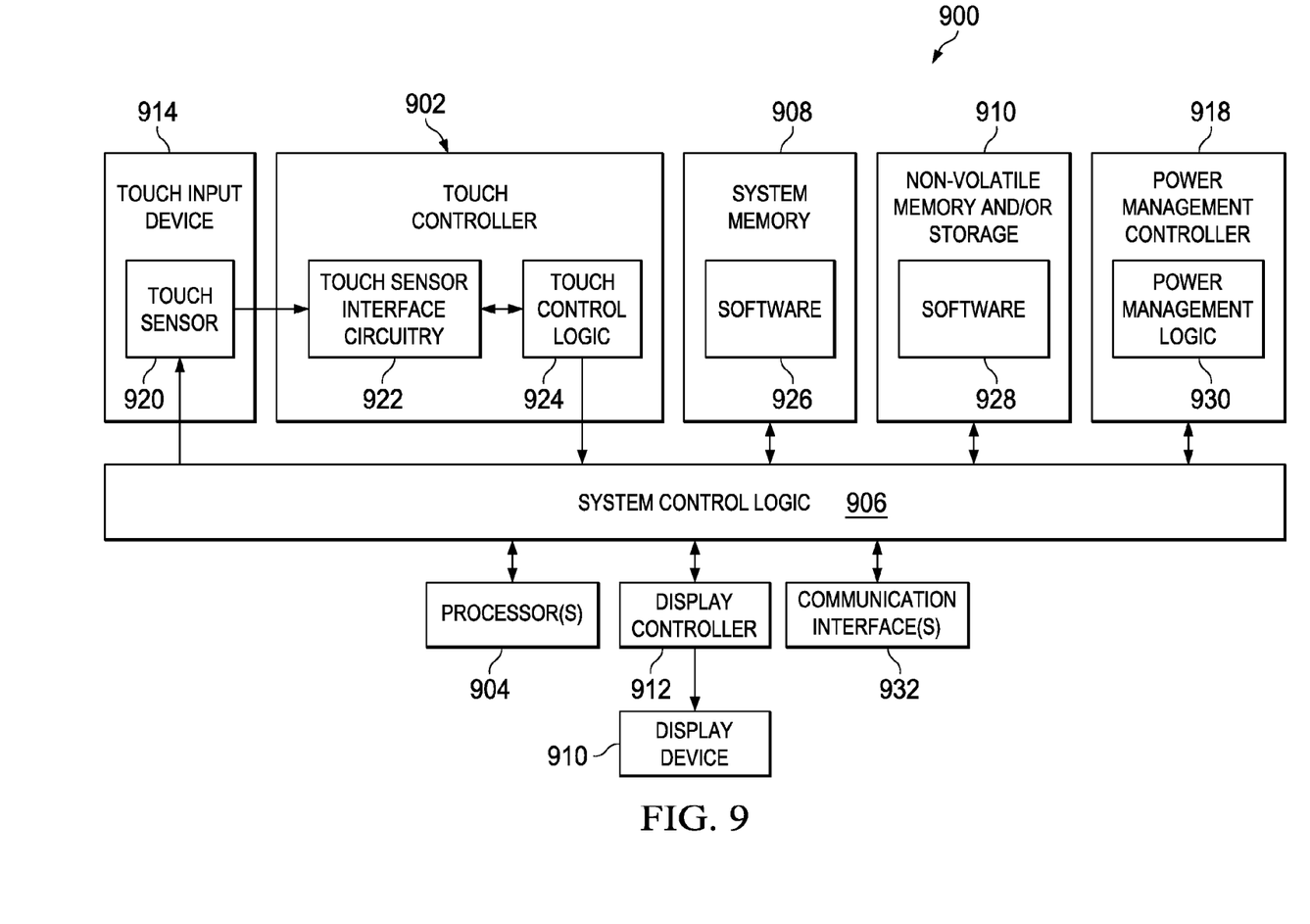
FIG. 9 is a simplified block diagram illustrating potential electronics associated with the electronic device.

FIG. 9 is a simplified block diagram illustrating potential electronics associated with electronic device 10. More particularly, FIG. 9 illustrates an embodiment of an example system 900 that may be included in any portion (or shared by portions) of electronic device 10. System 900 includes a touch input device 914, a touch controller 902, one or more processors 904, system control logic 906 coupled to at least one of processor(s) 904, system memory 908 coupled to system control logic 906, non-volatile memory and/or storage device(s) 910 coupled to system control logic 906, display controller 912 coupled to system control logic 906, display controller 912 coupled to a display, power management controller 918 coupled to system control logic 906, and communication interfaces 920 coupled to system control logic 906.

Touch input device 912 includes touch sensor 920 and may be implemented using any suitable touch-sensitive technology such as, for example and without limitation, capacitive, resistive, surface acoustic wave (SAW), infrared, and optical imaging. Touch input device 912, in a particular embodiment, may be implemented using any suitable multi-touch technology.

System control logic 906, in a particular embodiment, may include any suitable interface controllers to provide for any suitable interface to at least one processor 904 and/or to any suitable device or component in communication with system control logic 906. System control logic 906, in a particular embodiment, may include one or more memory controllers to provide an interface to system memory 908. System memory 908 may be used to load and store data and/or instructions, for example, for system 900. System memory 908, in a particular embodiment, may include any suitable volatile memory, such as suitable dynamic random access memory (DRAM) for example. System control logic 906, in a particular embodiment, may include one or more input/output (I/O) controllers to provide an interface to a display device, touch controller 902, and non-volatile memory and/or storage device(s) 910.

Non-volatile memory and/or storage device(s) 910 may be used to store data and/or instructions, for example within software 928. Non-volatile memory and/or storage device(s) 910 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 918 includes power management logic 930 configured to control various power management and/or power saving functions of electronic device 10 based upon whether electronic device 10 is in an open configuration or a closed configuration and/or a physical orientation of electronic device 10. In one embodiment, power management controller 918 is configured to reduce the power consumption of components or devices of system 900 that may either be operated at reduced power or turned off when electronic device 10 is in the closed configuration. For example, in a particular embodiment when electronic device 10 is in a closed configuration, power management controller 918 may perform one or more of the following: power down the unused portion of the display and/or any backlight associated therewith; allow one or more of processor(s) 904 to go to a lower power state if less computing power is required in the closed configuration; and shutdown any devices and/or components, such as keyboard 38, that are unused when electronic device 10 is in the closed configuration.

Communications interface(s) 920 may provide an interface for system 900 to communicate over one or more networks and/or with any other suitable device. Communications interface(s) 920 may include any suitable hardware and/or firmware. Communications interface(s) 920, in a particular embodiment, may include, for example, a network adapter, a wireless network adapter, a telephone modem, and/or a wireless modem.

System control logic 906, in a particular embodiment, may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one embodiment, at least one processor 904 may be packaged together with logic for one or more controllers of system control logic 906. In one embodiment, at least one processor 904 may be packaged together with logic for one or more controllers of system control logic 906 to form a System in Package (SiP). In one embodiment, at least one processor 904 may be integrated on the same die with logic for one or more controllers of system control logic 906. For a particular embodiment, at least one processor 904 may be integrated on the same die with logic for one or more controllers of system control logic 906 to form a System on Chip (SoC).

For touch control, touch controller 902 may include touch sensor interface circuitry 922 and touch control logic 924. Touch sensor interface circuitry 922 may be coupled to detect touch input over a first touch surface layer and a second touch surface layer of display 28. Touch sensor interface circuitry 922 may include any suitable circuitry that may depend, for example, at least in part on the touch-sensitive technology used for display 28. Touch sensor interface circuitry 922, in one embodiment, may support any suitable multi-touch technology. Touch sensor interface circuitry 922, in one embodiment, may include any suitable circuitry to convert analog signals corresponding to a first touch surface layer and a second surface layer into any suitable digital touch input data.

Suitable digital touch input data for one embodiment may include, for example, touch location or coordinate data.

Touch control logic 924 may be coupled to help control touch sensor interface circuitry 922 in any suitable manner to detect touch input over a first touch surface layer and a second touch surface layer. Touch control logic 924 for one embodiment may also be coupled to output in any suitable manner digital touch input data corresponding to touch input detected by touch sensor interface circuitry 922. Touch control logic 924 may be implemented using any suitable logic, including any suitable hardware, firmware, and/or software logic (e.g., non-transitory tangible media), that may depend, for example, at least in part on the circuitry used for touch sensor interface circuitry 922. Touch control logic 924 for one embodiment may support any suitable multi-touch technology.

Touch control logic 924 may be coupled to output digital touch input data to system control logic 906 and/or at least one processor 904 for processing. At least one processor 904 for one embodiment may execute any suitable software to process digital touch input data output from touch control logic 924. Suitable software may include, for example, any suitable driver software and/or any suitable application software. As illustrated in FIG. 9, system memory 908 may store suitable software 926 and/or non-volatile memory and/or storage device(s).

In one example embodiment, the motherboard of electronic device 10 is a general circuit board that can hold various components of the internal electronic system of electronic device 10. The components may include a central processing unit (CPU), a memory, etc. The motherboard can also couple to one or more connectors in order to accommodate other peripherals sought to be used by a user of electronic device 10. More specifically, the motherboard can provide the electrical connections by which the other components of the system can communicate.

Any processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation of an electronic device may include means for establishing a first electrical connection between a first base and a lid portion (e.g., over any suitable interface, link, bus, communication pathway, processor, software, circuitry, a hub, a controller, etc.). The electronic device may also include means for establishing a second electrical connection between a second base and the lid portion (e.g., over any suitable interface, link, bus, communication pathway, processor, software, circuitry, a hub, a controller, etc.). The lid portion is removably coupled to a selected one of the first base and the second base. In certain example implementations, the lid portion is coupled to the first base by a circuit board interconnector. Additionally, in certain examples, after the lid portion is removed from the first base, the lid portion is to communicate with the first base using a wireless module. In other examples, the wireless module is a Wi-Fi module. In still other examples, the lid portion is to operate as a tablet. In yet other example implementations, the first base includes a keyboard.

What is claimed is:

1. An electronic device, comprising:
a plurality of electronic components;
a first base having one or more connectors;
a second base that is different from the first base; and
a lid portion removably coupled to a selected one of the first base and the second base, the lid portion having a display at a first side of the lid portion and having a second side opposite the first side, wherein the lid portion further includes a substantially rectangular notch extending through the first side and the second side of the lid portion configured to mate with the one or more connectors of the first base, wherein a width of the substantially rectangular notch is greater than a width of a majority of the display.

2. The electronic device of claim 1, wherein the lid portion is coupled to the first base by a circuit board interconnector.

3. The electronic device of claim 1, wherein after the lid portion is removed from the first base, the lid portion is to communicate with the first base using a wireless module.

4. The electronic device of claim 3, wherein the wireless module is a Wi-Fi module.

5. The electronic device of claim 1, wherein the lid portion is to operate as a tablet.

6. The electronic device of claim 1, wherein the first base includes a keyboard.

7. The electronic device of claim 1, wherein the lid portion is to operate as a touch display.

8. The electronic device of claim 1, wherein the lid portion contains a camera and a microphone.

9. The electronic device of claim 1, wherein the lid portion is to attach to the first base with a magnet assembly.

10. The electronic device of claim 9, wherein the magnet assembly comprises a row of magnets.

11. The electronic device of claim 9, wherein the magnet assembly comprises two or more magnets.

12. The electronic device of claim 11, wherein the magnet assembly comprises alternating magnetic orientations.

13. The electronic device of claim 9, wherein the magnet assembly comprises a backing configured to reduce stray magnetic fields.

14. The electronic device of claim 1, wherein the second base comprises a battery pack and a wireless module.

15. The electronic device of claim 1, wherein power and data is to flow between the first base and the lid portion when the first base and the lid portion are coupled together.

16. The electronic device of claim 1, wherein the lid portion may be coupled to the first base in a clamshell configuration of the electronic device.

17. An electronic device, comprising:
- a plurality of electronic components;
- a lid portion including a substantially rectangular notch, the lid portion having a display at a first side of the lid portion and having a second side opposite the first side, wherein a width of the substantially rectangular notch is greater than a width of a majority of the display; and
- a base having one or more connectors, wherein one or more connectors of the base are to mate with the substantially rectangular notch of the lid portion with the first side of the lid portion facing away from the base for a first configuration of the electronic device, and wherein one or more connectors of the base are to mate with the substantially rectangular notch of the lid portion with the second side of the lid portion facing away from the base for a second configuration of the electronic device, wherein the substantially rectangular notch extends through the first and second sides of the lid portion.

18. The electronic device of claim 17, wherein the first configuration is a tablet configuration.

19. The electronic device of claim 17, wherein one or more connectors of the base are coupled to a hinge of the base to allow the lid portion to rotate relative to the base.

20. The electronic device of claim 19, wherein the hinge is to allow the lid portion to rotate relative to the base for the second configuration of the electronic device.

21. The electronic device of claim 20, wherein the second configuration is a notebook configuration.

22. The electronic device of claim 19, wherein the hinge is to allow the lid portion to rotate relative to the base for the first configuration of the electronic device.

23. The electronic device of claim 17, wherein one or more connectors of the base includes an elongated connector to mate with the substantially rectangular notch of the lid portion.

24. An electronic device that includes at least one processor, comprising:
- means for establishing a first electrical connection between a first base and a lid portion, the first base including one or more connectors, and the lid portion having a display at a first side of the lid portion and having a second side opposite the first side, wherein the lid portion further includes a substantially rectangular notch extending through the first side and the second side of the lid portion configured to mate with the one or more connectors of the first base, wherein a width of the substantially rectangular notch is greater than a width of a majority of the display; and
- means for establishing a second electrical connection between a second base and the lid portion, wherein the lid portion is removably coupled to a selected one of the first base and the second base.

25. The electronic device of claim 24, wherein the lid portion is coupled to the first base by a circuit board interconnector.

26. The electronic device of claim 24, wherein after the lid portion is removed from the first base, the lid portion is to communicate with the first base using a wireless module.

27. The electronic device of claim 24, wherein the wireless module is a Wi-Fi module.

28. The electronic device of claim 24, wherein the lid portion is to operate as a tablet.

29. The electronic device of claim 24, wherein the first base includes a keyboard.

* * * * *